Sept. 20, 1971 M. C. SMITH ET AL 3,605,428
PRODUCT FREEZING WITH VAPOR CONDENSATION
Filed March 5, 1970 3 Sheets-Sheet 1
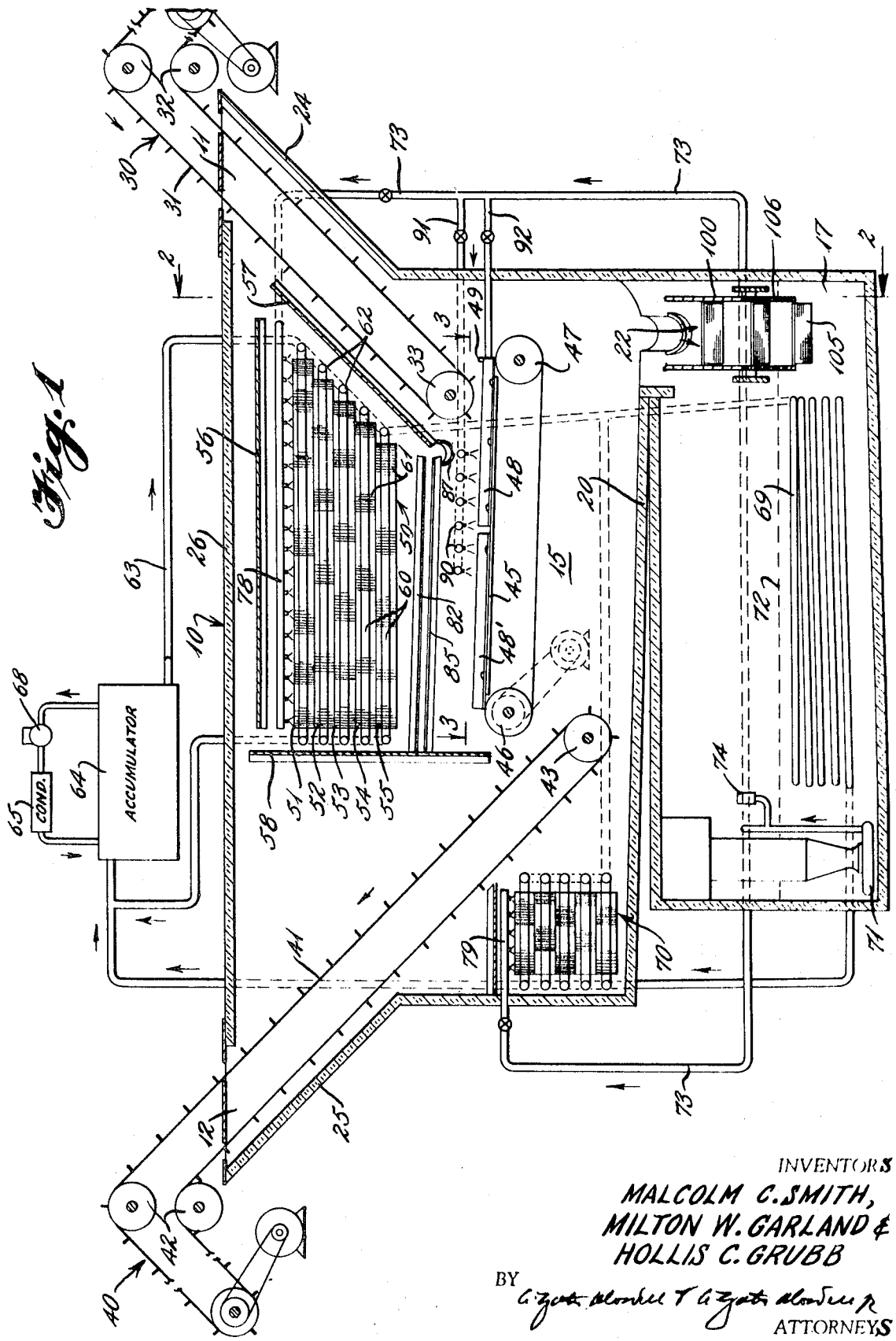
INVENTORS
MALCOLM C. SMITH,
MILTON W. GARLAND &
HOLLIS C. GRUBB
BY
ATTORNEYS

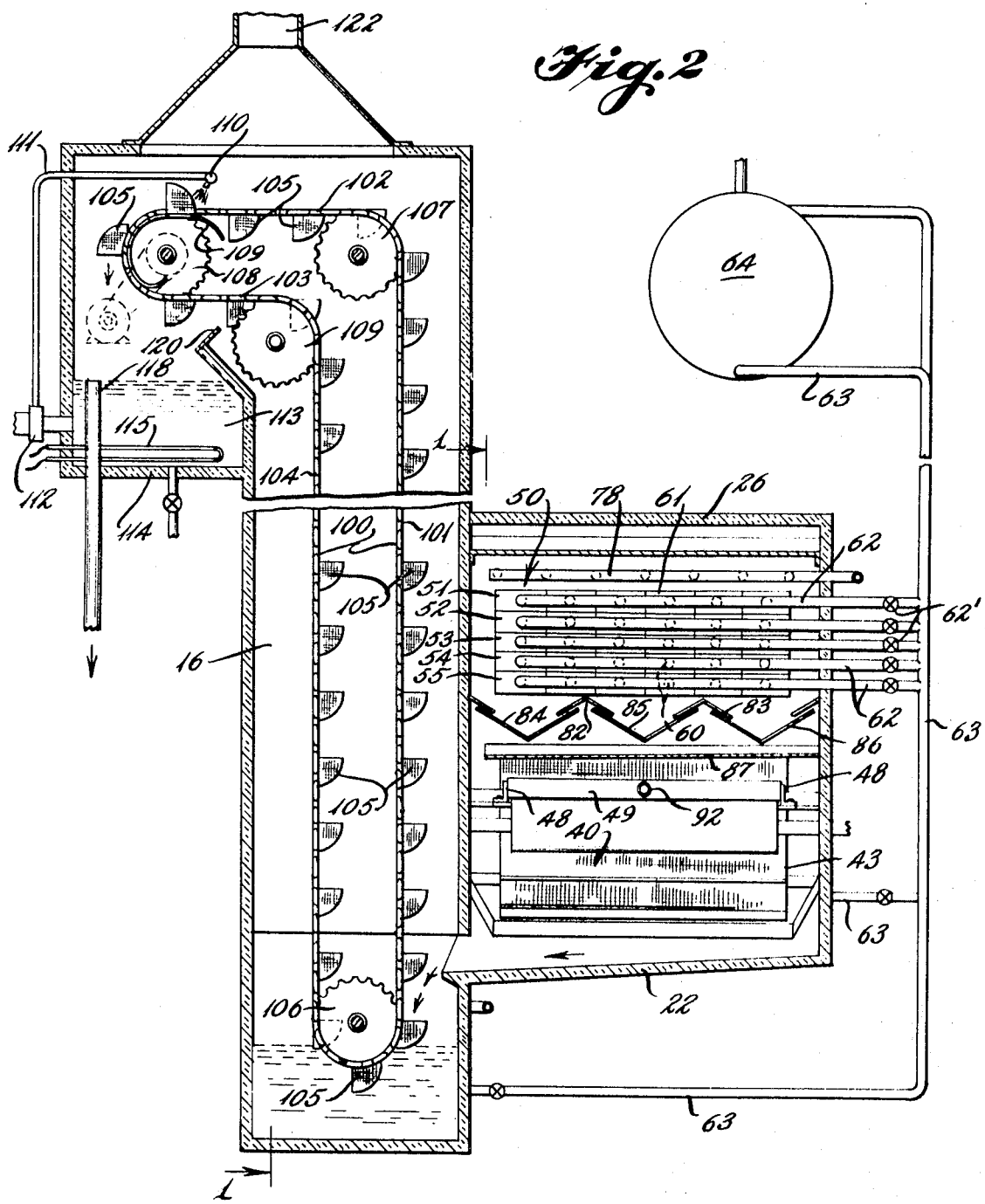

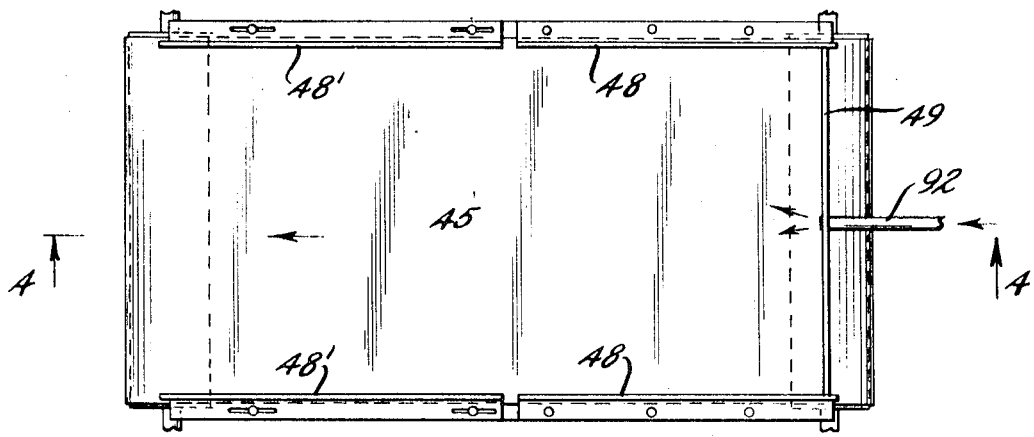
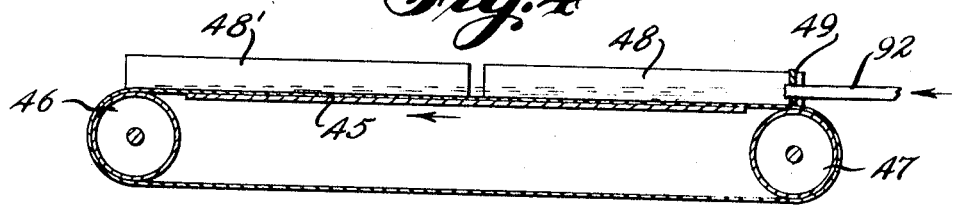
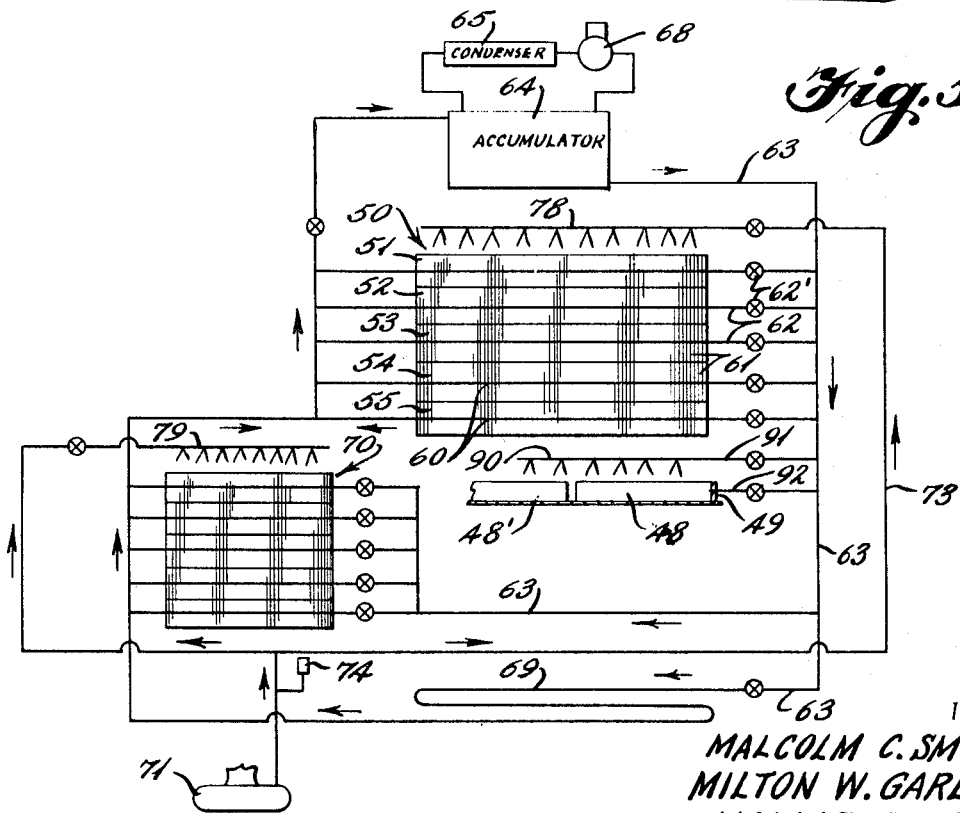

United States Patent Office 3,605,428
Patented Sept. 20, 1971

3,605,428
PRODUCT FREEZING WITH VAPOR CONDENSATION
Malcolm C. Smith, Hagerstown, Md., and Milton W. Garland, Waynesboro, and Hollis C. Grubb, Chambersburg, Pa., assignors to Frick Company, Waynesboro, Pa.
Filed Mar. 5, 1970, Ser. No. 16,833
Int. Cl. F25d 17/00
U.S. Cl. 62—64         16 Claims

ABSTRACT OF THE DISCLOSURE

Food or other product is introduced into a housing unsealed at the top in which the atmosphere is maintained at all times during product freezing at a temperature lower than the saturation temperature of the freezing refrigerant at atmospheric pressure. The temperature is maintained by constantly circulating the freezing refrigerant over a low temperature heat exchanger. The product may be sprayed and immersed in the freezing refrigerant whose supply is constantly circulated through a separator for removing product particles, ice and other foreign matter.

BACKGROUND OF THE INVENTION

Field of the invention

This invention pertains to refrigeration and more particularly to the freezing of products such as foods in relatively small pieces or units. Various items of food are processed including, but not limited to, beans, peas, strawberries, shrimp, fish, meat and meat patties. Products that are breaded or similarly prepared may also be frozen.

The invention is concerned with the freezing of products economically and maintaining them in the best condition. The freezing of products requires consideration of and attention to their composition, texture, particle size and the like, so that the products are properly frozen without undesirable thermal shock, without changing the character of the product, dislodging or removing any coating that has been applied thereto, and without altering the taste.

Description of the prior art

Food products have been frozen heretofore by various procedures including immersion in a liquid refrigerant, spraying with liquid refrigerant, and subjecting the same to refrigerated air either moving in a stream or relatively still. The immersion in liquid refrigerant or the spraying of products with liquid refrigerant may produce thermal shock resulting in cracking or injuring the product. It may also erode or remove any coating that has been applied.

Subjection to refrigerated air either moving or still has drawbacks such as the possibility of slow or uneven freezing or excessive drying of the product. Furthermore, the use of refrigerated air requires a relatively large space, relatively large freezing time, substantial power for circulating the air, the necessity for periodic defrosting, and problems in maintenance and cleaning of the apparatus. In comparison therewith the present invention may materially decrease the space and time required, eliminates the need for circulating air, is relatively easy to clean, and requires little or no defrosting. Furthermore, certain products that are of high moisture content are relatively difficult to freeze and retain high quality as compared with the practice of the present invention.

Another approach to freezing food products is described in the patents to Vincent H. Waldin, Nos. 3,479,-833, 3,482,412 and 3,486,345. The Waldin patents describe an arrangement and procedure whereby a layer of refrigerant vapor is maintained over the lower portion of the cooling area and the interface at its upper boundary is maintained as quiescent as possible for the purpose of reducing vaporous refrigerant loss. In these patents the refrigerant is cooled by a condenser on which ice collects and must be periodically removed, necessitating shutting down a portion of the condensing surface from time to time. It is recognized, however, that in many installations of ordinary size the loss of refrigerant is excessive. Furthermore, due to the maintenance of the refrigerant vapor blanket a safety hazard is present with reference to human breathing and, with some refrigerants, the possibility of fire.

SUMMARY OF THE INVENTION

The present invention provides for the controlled removal of heat from the product without exposing it to eroding forces, at least until the outer surface of the product is sufficiently frozen to resist such forces. The freezing or direct contact refrigerant that is presently accepted by the U.S. Food and Drug Administration is the highly volatile halocarbon dichlorodifluormethane, otherwise known as R12. Other refrigerants of comparable properties or nature may be employed provided the approval of public health authorities is obtained. An example of another refrigerant having such properties, but at present not approved for such use by public health authorities is chlorodifluoromethane, known as R22. The refrigerant R12 is well known, having a boiling point at atmospheric pressure of approximately —22° F. Because of its relatively low boiling point or saturation temperature, all traces of it may be removed from the product while it is within the freezer and the refrigerant recovered for subsequent use and the substantial avoidance of loss to the atmosphere.

Applicant's invention includes the freezing of a product at atmospheric pressure within a housing which is unsealed at the top and in which the atmosphere is maintained at a temperature substantially lower than the saturation temperature of the freezing refrigerant at the atmospheric pressure. The temperature is maintained by continuous recirculation of the freezing refrigerant in its liquid form over surfaces which are refrigerated from a secondary source. The atmosphere within the housing is therefore stratified below the top access openings of the housing.

Products are brought into the housing on an inclined conveyor, cooled during its descent, passed along a lower level in the housing where it may be subjected to subcooled liquid refrigerant spray, or passed through a subcooled liquid refrigerant bath or a combination of both, following which it is discharged onto a conveyor for removal out of the housing. The freezing liquid refrigerant is continuously recirculated through a separator for removing foreign matter.

DETAILED DESCRIPTION OF THE INVENTION

The present invention will be further described in conjunction with the drawings in which:

FIG. 1 is a schematic elevation with portions in section of a system embodying the present invention, such section taken on the line 1—1 of FIG. 2, and showing only the lower portion of the freezing refrigerant separator;

FIG. 2 a section on the line 2—2 of FIG. 1, and illustrating the separator;

FIG. 3 is a section to an enlarged scale on the line 3—3 of FIG. 1;

FIG. 4 is a section on the line 4—4 of FIG. 3; and

FIG. 5 is a schematic of the secondary refrigeration system.

The present invention includes a housing 10 having insulated walls, an upper inlet opening 11 and upper discharge opening 12. The housing has a main freezing section 15 a separator section 16 and a sump section 17. The lower wall or board 20 of the main section 15 is inclined downwardly toward the section 16 in order that liquid thereon will drain into the gutter 22 for discharge into the separator section 16 which forms a portion of the sump section 17.

The housing has inclined side walls 24 and 25 adjacent to the entrance and exit conveyors and a top wall 26, the side and top walls defining openings slightly larger than required for the passage of the conveyors.

By constructing the housing as described, the conveyors may extend on an incline into the housing until they reach the desired level therewithin.

In order to convey the product into the housing a first conveyor belt 30 is provided having an inclined entering run 31 which passes over rollers 32 outside of the housing and a roller 33 at the lowermost portion of the run within the housing.

A product discharge belt 40 similarly has an inclined discharging run 41, outer support rollers 42 and a lower roller 43. Roller 33 is positioned in spaced relation from and above a roller 47 in order that the product may be discharged from the former onto a substantially horizontal conveyor 45 carried by rollers 46 and 47. Conveyors 30 and 40 are preferably of open or mesh construction whereas conveyor 45 is of the closed or imperforate type.

In order to retain a pool of liquid refrigerant on the upper run of conveyor 45, side boards 48 and 48' are positioned in engagement with the sides of the upper run and an end board 49 at the entering portion of the upper run. The upper run of the conveyor 45 perferably slopes substantially upwardly, in the direction of travel in order to maintain a deeper pool on the portion onto which the product is initially discharged. The side boards 48' may be adjusted longitudinally by an elongated slot and pin arrangement, see FIG. 3, to control the depth of the pool of liquid along the top of the upper run.

The belts are preferably individually controlled in order to permit variations in speed that may be required for the processing of various products. Mounted at an elevation within the housing and above the conveyor 45 and overlying a portion of the conveyor 30 are a series of extended surfaces or cooling coils 50 which constitute the evaporator of a secondary refrigeration system. These coils are several in number and identified as numbers 51, 52, 53, 54 and 55. The uppermost coil 51 is the longest, the others being progressively shorter at progressively lower levels within the housing. Wall or baffle elements 56, 57 and 58 are positioned above the uppermost coil and adjacent to the ends of the coils in order better to isolate this portion of the space within the main freezing section from the remainder thereof.

The coils may be of various types, those illustrated having the usual inner pipes 60 surrounded by fins 61 attached thereto. While rectangular fins on rounded pipes horizontally disposed are illustrated, any heat transfer surfaces of a capacity capable of transferring the refrigerated load may be employed. Similarly, the number and arrangement of the coils may vary provided that the principle of the invention is carried out.

The coils 51-55 form part of a secondary refrigerating system and are connected by branches 62 and 63 which conveys refrigerant from an accumulator 64 of a conventional refrigeration system including a compressor 68 and condenser receiver 65.

The secondary refrigeration system also supplies refrigerant to coils 69 positioned at the lower portion in sump section 17 and to the coils 70 positioned in the lower portion of the main portion of the housing 15 and adjacent to the product discharge end.

The sump has a pump 71 which pumps liquid freezing refrigerant 72 from the sump through pipes 73 at a controlled pressure maintained by relief 74 and delivers freezing refrigerant to the primary spray header 78 which is positioned over the uppermost coil 51 and coextensive therewith. The freezing refrigerant is circulated in sufficient quantity to continuously bathe all of the surfaces of the coils 51-55 inclusive with the freezing refrigerant in order adequately to subcool the refrigerant and to prevent condensation of freezing refrigerant and/or moisture on any of the coils 51-55.

This same coil coverage with liquid freezing refrigerant is applied by header spray 79 to the secondary cooling coils 70.

In order to avoid the dripping or discharge of the refrigerant from the outer surface of the coils 51-55 onto any of the conveyor belts, a series of baffles are arranged beneath the coils. The baffles include an upper downwardly sloped series 82 and 83 which discharge onto a lower series of baffles 84, 85 and 86 which face upwardly forming a drain gutter. The baffles are inclined longitudinally toward the end of the housing and the sump and discharge into a lateral gutter 87 in order that liquid collected thereon would be discharged into the sump. In order to spray liquid refrigerant over the product, a series of spray headers 90 are positioned over the upper run of the conveyor 45 for such distance as may be desired and are connected by pipe 91 to spray pipe 73.

Branch pipe 92 is mounted to discharge liquid refrigerant onto the top surface of the entrance portion of conveyor 45 for maintaining the level of liquid refrigerant thereon as may be desired.

In order to separate foreign matter from the liquid refrigerant, a separator is provided as indicated in FIG. 2. This includes a conveyor 100 having an ascending run 101, an upper substantially horizontal run 102, a lower substantially horizontal run 103 and a descending run 104. Mounted on the conveyor are buckets 105 which are of open work or mesh. The conveyor is driven around a lower sprocket 106, upper sprockets 107 and 108 and an intermediate sprocket 109. The buckets are pivotally mounted as indicated in order to open upwardly on runs 101 and 102 and to dump as they traverse sprocket 108 after engaging arm 109.

Adjacent to and mounted over the sprocket 108 is a spray discharge nozzle 110 which receives water through pipe 111 and pump 112. The pump draws the water from sump 113 mounted beneath the sprocket 108. Within the sump is a heater 115 for maintaining the temperature of the water above freezing. An overflow pipe 118 carries away trash that floats on the surface of the water. In order to reduce the circulation of air, a baffle plate 120 extends inwardly from the top of the side wall of the housing.

At the top of the housing an opening 122 is provided as a vent for the housing 16.

The housing 16 is so constructed that the bottom wall 114 of the water sump is at a higher elevation than the top wall 26 of the main portion of the housing 10. This arrangement prevents loss of atmosphere from within the housing 10 due to the difference in specific gravity of the colder air therein and the air within the housing 16.

OPERATION

In considering the operation it should be borne in mind that the purposes include avoiding loss of the freezing refrigerant, avoiding condensation from the atmosphere within the housing and especially on the coils 51-55, avoiding thermal shock to the product and controlling the direct application of freezing liquid refrigerant onto the product.

In starting operation, the refrigerant from the secondary system is introduced initially into the coils 69 in the sump, then to the coil 70 adjacent to the discharge conveyor, and then into coils 51-55. Then the freezing refrigerant is slowly charged into the sump 17 until it has attained a sufficient level for the commencement of operation. This procedure results in the release gradually from the bottom of the housing of refrigerant vapor which being colder than air, and therefore heavier, gradually forces the latter upwardly out of the housing with little or no condensation of moisture from the air onto the coils and other surfaces within the housing.

Pump 71 is then started to spray refrigerant over the coils 51–55, and 70.

The product is placed on the run 31 of the conveyor 30 and moved downwardly along the incline until it reaches the horizontal conveyor portion 45. Due to stratification of the atmosphere within the housing, the product is subjected to the warmer atmosphere initially and to gradually cooler atmosphere as it descends.

The secondary refrigerant system is operated to maintain the secondary refrigerant substantially below the saturation temperature of the freezing refrigerant at the atmospheric pressure. Thus these coils may be operated at about −40° F. to −45° F., where as the freezing refrigerant is R12 whose saturation temperature is approximately −22° F. As a result of constant subcooling of the freezing refrigerant by the secondary system, the atmosphere within the housing is maintained at approximately −30° F. This causes the freezing refrigerant which vaporizes to immediately condense so that the atmosphere within the housing is relatively free of any freezing refrigerant vapor.

The rate of flow of the liquid freezing refrigerant over the coils 51–55 and the distribution thereon constantly bathes the coils in liquid freezing refrigerant thereby preventing the condensation thereon of freezing refrigerant vapors and moisture from the atmosphere. Thus, any need for periodic defrosting is avoided.

The speed of the conveyors is regulated in accordance with the product being handled. Thus in relatively large or high moisture content products the speed may be slower and immersion in liquid refrigerant and spray may be applied. In relatively low moisture content products, especially those that are relatively small or in small units, the speed may be more rapid and immersion unnecessary and refrigerant spray very limited.

In order to be sure of removing all traces of liquid refrigerant from the product the latter is cooled only to the extent necessary but with enough residual heat content to cause the evaporation of any refrigerant that may be trapped in or on the product as it is discharged onto the conveyor 40.

When the product freezing operation is discontinued it is desirable that the refrigerant be recovered with minimum loss. This is carried out by initially stopping the flow of the freezing refrigerant to the spray header 78 above the coils 51–55. Then the refrigerant in the secondary system to the coils 51–55 is cut off. These surfaces become warmer initially and refrigerant which has condensed on them will evaporate and condense on the colder surfaces below due to the lower vapor pressure within the lower portion of the housing by coils 70. Freezing refrigerant circulation over coils 70 is then discontinued and secondary refrigerant is also cut off from these. This causes a progressive transfer of the freezing refrigerant into sump 17 from which it may be drained.

What is claimed is:

1. The method of freezing a product in small units, comprising maintaining a chamber open to atmosphere at its upper portion, introducing the product into the chamber from its upper portion and conveying it at a controlled rate downwardly and along a lower portion and then upwardly to the upper portion for discharge, maintaining a supply of volatile subcooled liquid refrigerant in the chamber at a level below that of the lower portion, maintaining extended surfaces in the chamber at an elevation above the lower portion and at a temperature substantially below that at which the vaporized refrigerant condenses, continuously applying the refrigerant from the supply over said extended surfaces in order to maintain the subcooling of the refrigerant and of the atmosphere within the chamber and to avoid condensation on said surfaces, whereby refrigerant vapor in the chamber is continuously condensed in the atmosphere as it forms, and collecting refrigerant descending from the surfaces and from within the chamber and returning it to the supply.

2. The invention as defined in claim 1, and discharging liquid refrigerant from said supply onto the product as it is conveyed along the lower portion of the chamber.

3. The invention as defined in claim 1, and maintaining a pool of subcooled liquid refrigerant from the supply along the lower portion, and conveying the product through said pool.

4. The invention as defined in claim 1, and maintaining additional extended surfaces in the chamber adjacent to the lower portion of the chamber and to the product as it is conveyed upwardly, and applying refrigerant from the supply over said additional extended surfaces.

5. The invention as defined in claim 1, and separating foreign matter from the collected refrigerant prior to returning it to the supply.

6. Apparatus for freezing a product comprising a housing, said housing having at least one normally open-to-atmosphere passageway at its upper portion, means for conveying the product downwardly into the housing and along a lower elevation and then upwardly out of the housing for discharge, means for storing liquid refrigerant within the housing at a level beneath said lower elevation of the conveying means, a secondary refrigeration system having extended cooling surfaces in the housing at an elevation above the product which is at said lower elevation therein, means for circulating liquid refrigerant from said storing means over said secondary refrigeration system, in which the secondary refrigeration system is operated at a temperature substantially lower than the saturation temperature of the liquid refrigerant at atmospheric pressure, whereby the atmosphere within the housing is maintained at said substantially lower temperature, thereby causing condensation within the atmosphere of evolved refrigerant vapors.

7. The invention as defined in claim 6, and means for returning the refrigerant which flows over the cooling surfaces of said secondary refrigeration system to the storing means and avoiding contact thereof with the product.

8. The invention as defined in claim 6, in which the liquid storing means is directly cooled by the secondary refrigeration system.

9. The invention as defined in claim 6, and means for discharging liquid refrigerant from the liquid storing means onto the product as the latter is conveyed at said lower elevation.

10. The invention as defined in claim 6, and means for accumulating a pool of liquid refrigerant through which the product is passed as it is conveyed at said lower elevation.

11. The invention of claim 10 in which said accumulating means is adjustable in order to vary the depth of the pool.

12. The invention as defined in claim 6 in which the extended cooling surfaces are at various levels, and the surface area increases, step-by-step, from a lower to an upper level.

13. The invention as defined in claim 6 in which additional extended cooling surfaces are positioned adjacent to the lower portion of the discharge conveyor means, and means for discharging liquid refrigerant from the liquid storing means onto said additional surfaces.

14. The invention of claim 6 in which liquid refrigerant within the housing which is above the storing means is received in a common drain, said drain having means for separating liquid refrigerant from foreign matter therein.

15. The invention of claim 14 in which said separating means includes an auxiliary housing communicating with said housing and having a lower portion below the level of said housing and an upper portion above the level of said housing, said auxiliary housing having conveyor means therein, said conveyor means having sieve means for receiving the drained refrigerant and carrying the foreign matter therein to a higher elevation and means for dumping said sieve means at said higher elevation.

16. The invention of claim 15 in which receptacle means is provided at the upper portion of said auxiliary housing onto which said sieve means is dumped, said receptacle means having means for raising the temperature of liquid therewithin and for continuously discharging material therefrom.

References Cited

UNITED STATES PATENTS 3,498,069  3/1970  Waldin _____ 62—63

MEYER PERLIN, Primary Examiner

R. C. CAPOSSELA, Assistant Examiner

U.S. Cl. X.R.

62—119, 375